INVENTORS.
YUZURU YANAGISAWA
SHINJI KUSUNOKI
BY
ATTORNEY.

INVENTORS.
YUZURU YANAGISAWA
BY SHINJI KUSUNOKI

Louis H. Eslinger
ATTORNEY.

INVENTORS.
YUZURU YANAGISAWA
SHINJI KUSUNOKI
BY
ATTORNEY.

INVENTORS
YUZURU YANAGISAWA
SHINJI KUSUNOKI
BY
[signature]
ATTORNEY

| TIME | CONTENTS OF REGISTER | COUNTER |
|---|---|---|
| t1 | 0 0 0 0 1 0.3 | 0 |
| t2 | 3 0 0 0 0 1 0. | 0 |
| t3 | 0.3 0 0 0 0 1 | 0 |
| t4 | 1 0.3 0 0 0 0 | 0 |
| t5 | 0 1 0.3 0 0 0 | 6 |
| t6 | 0 0 1 0.3 0 0 | 5 |
| t7 | 0 0 0 1 0.3 0 | 4 |
| t1 | 0 0 0 0 1 0.3 | 3 |
| t2 | 3 0 0 0 0 1 0. | 2 |
| t3 | 0.3 0 0 0 0 1 | 1 |
| t4 | 1 0.3 0 0 0 0 | 0 |
| t5 | X 1 0.3 0 0 0 | 0 |
| t6 | X X 1 0.3 0 0 | 0 |
| t7 | X X X 1 0.3 0 | 0 |
| t1 | X X X X 1 0.3 | 0 |
| t2 | 3 X X X X 1 0. | 0 |
| t3 | 0 3 X X X X 1 | 0 |

| TIME | CONTENTS OF REGISTER | COUNTER |
|---|---|---|
| t1 | 0 0 0 0 1 0.3 | 0 |
| t2 | 3 0 0 0 0 1 0. | 0 |
| t3 | 0.3 0 0 0 0 1 | 0 |
| t4 | 1 0.3 0 0 0 0 | 0 |
| t5 | 0 1 0.3 0 0 0 | 6 |
| t6 | 0 0 1 0.3 0 0 | 5 |
| t7 | 0 0 0 1 0.3 0 | 4 |
| t1 | 0 0 0 0 1 0.3 | 3 |
| t2 | 3 0 0 0 0 1 0. | 2 |
| t3 | X.3 0 0 0 0 1 | 1 |
| t4 | 1 X.3 0 0 0 0 | 0 |
| t5 | 0 1 X.3 0 0 0 | 0 |
| t6 | 0 0 1 X.3 0 0 | 0 |
| t7 | 0 0 0 1 X.3 0 | 0 |
| t1 | 0 0 0 0 1 X.3 | 0 |
| t2 | 3 0 0 0 0 1 X. | 0 |
| t3 | X.3 0 0 0 0 1 | 0 |

INVENTORS
YUZURU YANAGISAWA
BY SHINJI KUSUNOKI
[signature]
ATTORNEY.

INVENTORS
YUZURU YANAGISAWA
SHINJI KUSUNOKI
BY [signature]
ATTORNEY.

INVENTORS
YUZURU YANAGISAWA
BY SHINJI KUSUNOKI
[signature]
ATTORNEY

Feb. 2, 1971 YUZURU YANAGISAWA ET AL 3,560,954

NUMBER AND SYMBOL DISPLAY SYSTEM

Filed Oct. 30, 1968 9 Sheets-Sheet 8

INVENTORS
YUZURU YANAGISAWA
SHINJI KUSUNOKI

BY

[signature]

ATTORNEY.

NUMBER AND SYMBOL DISPLAY SYSTEM

Filed Oct. 30, 1968 9 Sheets-Sheet 9

INVENTORS.
YUZURU YANAGISAWA
BY SHINJI KUSUNOKI

Louis H. Eslinger

ATTORNEY.

United States Patent Office 3,560,954

Patented Feb. 2, 1971

3,560,954
NUMBER AND SYMBOL DISPLAY SYSTEM
Yuzuru Yanagisawa, Kanagawa-ken, and Shinji Kusunoki, Tokyo, Japan, assignors to Sony Corporation, Tokyo, Japan, a corporation of Japan
Filed Oct. 30, 1968, Ser. No. 771,717
Claims priority, application Japan, Nov. 2, 1967, 42/70,427
Int. Cl. G06k 15/18
U.S. Cl. 340—324 15 Claims

ABSTRACT OF THE DISCLOSURE

In a number and symbol display system for a computer, the digit portions of a register are sequentially supplied with codes respectively representing the digits of an effective number to be displayed with the codes representing any futile "0's" being distinctive in respect to the codes representing any "0's" in such effective number, a display device responds to the sequentially supplied output of the register to display at its respective digit portions the digits of the effective number represented by their respective codes in the register output and avoids the display of any futile "0's" represented by their distinctive codes, the distinctive code in the register output is detected and, in response to such detection, a control output signal is supplied to a display device at a digit time position that is one or two digit times later than that of the most significant digit of the effective number as determined by the detected distinctive code to cause the display device to display the symbol represented by a supplied symbol code in the digit portion of the display device that is one or two digit positions higher than that of the digit portion displaying the most significant digit of the displayed effective number.

BACKGROUND OF THE INVENTION

This invention relates to a number and symbol display system for electronic computers, and more particularly to such systems adapted for serially displaying a number and symbol.

In conventional number and symbol display systems for electronic computers, when the content of a register to be admitted to a serial display device is "—00000000005," for example, it is the usual practice to display such content as "—00000000005." Thus, difficulty is experienced in reading the displayed effective number, or "5" in this example, since futile or insignificant "0's" are indicated in the digit positions higher than that of "5."

To avoid such difficulty, it has been proposed to display "— 5" rather than "—00000000005" by eliminating such futile or unnecessary "0's". However, difficulty is still encountered in reading the displayed effective number with the symbol, since there is an unnecessarily great spacing between the displayed symbol "—" and the displayed effective number "5."

Accordingly, it is an object of this invention to provide number and symbol display systems for electronic computers in which the display of insignificant or futile "0's" is avoided, and further in which any symbol to be displayed appears sufficiently close to the most significant digit of the displayed effective number to facilitate the accurate reading of the displayed number and symbol.

SUMMARY OF THE INVENTION

Thus, in accordance with the present invention, when the content of a register to be admitted to a serial display device is "—00000000005" as in the above case for example, it is displayed as " —5" or " — 5." That is, the symbol "—" is indicated at a position higher by one or two digits than that of the most significant digit of the displayed effective number.

The foregoing is generally achieved according to the invention by sequentially supplying to a plurality of digit portions of a register codes respectively representing the digits of the effective number and to avoid display of any codes representing the futile "0's" in digit positions higher than that of the most significant digit of the effective number to be displayed being distinctive in respect to the codes representing any "0's" in such effective number, sequentially supplying the register output to a display device with the codes from the digit portions of the register, in ascending order of significance, appearing at successive digit time positions and with the display device being operative to display, at its respective digit portions, the digits of the effective number and to avoid display of any futile "0's" represented by their distinctive code in the register output, detecting the distinctive code in the register output representing futile "0's", and, in response to the detection of such distinctive code, providing to the display device a control output signal at a digit time position that is later by one or two digit times than the digit time position of the most significant digit as determined by the detected distinctive code to cause the display device to display the symbol represented by a supplied symbol code in the digit portion of the display device that is one to two digit positions higher than that of the digit portion displaying the most significant digit of the displayed effective number.

The above, and other objects, features and advantages of this invention, will be apparent in the following detailed description of illustrative embodiments which is to be read in connection with the accompanying drawings.

DESCRIPTION OF THE PREFERRED EMBODIMENT

Figure 1A:
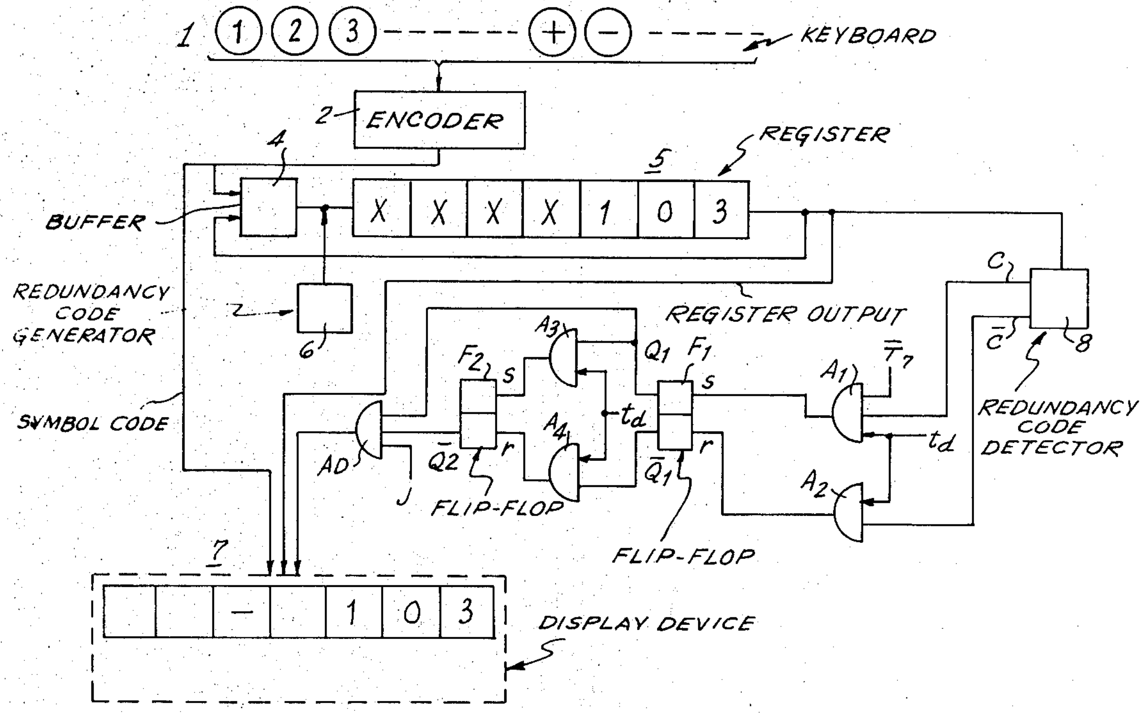
FIG. 1A is a block diagram of a number and symbol display system for electronic computers in accordance with a first embodiment of this invention.

Referring first to FIG. 1A, it will be seen that, in the system there illustrated, the reference numeral 1 represents a key board including numeral keys such as "1,"

"2," "3" . . . and symbol keys such as "+," "—," "×," "÷" and so forth. By successively depressing the numeral keys (except for the symbol keys), electric signals are produced which are sequentially supplied to an encoder 2 which provides coded signals corresponding to the respective numeral keys.

The signals thus coded by the encoder 2 are supplied to a register 5 through a buffer 4. It is to be noted here that with conventional arrangements the content in each digit portion of the register 5 prior to admission of the output of the encoder 2 thereto is "0" while in accordance with the present invention such content is a redundancy code X which is not decoded as content representing a numeral or a symbol in a display device which will be hereinafter referred to. The reference numeral 6 denotes a redundancy code generating circuit.

Assume that the "1," "0" and "3" keys on the key board are depressed in this order, and the "—" symbol key is depressed either thereafter or therebefore in order to display "—103." Then, the content of the register 5 is "XXXX103" in the case where, as shown, the number of digit portions in the register is seven, that is, the register has a word cycle of seven digits.

The content of the register 5 is sequentially applied to a display device 7 as a serial input of "3"-"0"-"1"-"X"-"X"-"X"-"X." The coded output corresponding to the "—" symbol key is also supplied to display device 7. Since the redundancy codes "X" are not decoded in display device 7, the output of the register 5 is displayed in such a manner that "3," "0" and "1" are indicated at the 1st, 2nd and 3rd digit positions of the display device 7, with no "0's" being indicated at the 4th to 7th digit positions.

In accordance with the present invention, however, the display device 7 is supplied also with the content representing the minus symbol "—" as described above, and the display device is controlled by the output of logic circuits which will be described below so that the minus symbol "—" is indicated at the digit position higher by one or two digits than that of the most significant digit of the displayed effective number (at the fourth or fifth digit position, in the foregoing example). Thus, the indication of "      —103" or "      —103" is produced.

Logic circuits adapted to cause the minus symbol "—" to be indicated at the position higher by two digits than that of the most significant digit of a displayed effective number (at the fifth digit position in the present example), will not be described with reference to FIG. 1A.

In the arrangement as shown on FIG. 1A, the content of the output of register 5 is sequentially admitted to a redundancy code detecting circuit 8 which provides a detection output C when it receives the redundancy code X and a detection output $\overline{C}$ when it receives a non-redundancy code. An AND circuit $A_1$ receives the output C, a timing pulse $t_d$ produced at the last bit of each digit code output of the register 5 which, for example, may employ 4 time bits for the code representing each digit, and a "NOT" output $\overline{T}_7$ of a timing pulse $T_7$ occurring at the end of each one-word cycle of register 5. In the example given, the timing pulse $T_7$ occurs at every 7-digit time since the register 5 is shown to have seven digit portions. The output of AND circuit $A_1$ is supplied to set terminal $s$ of a flip-flop $F_1$. The output $\overline{C}$ of detector 8 and timing pulse $t_d$ are imparted to an AND circuit $A_2$, and the output of the latter is applied to reset terminal $r$ of flip-flop $F_1$. Thus, outputs $Q_1$ and $\overline{Q}_1$ are available at "YES" and "NOT" output terminals, respectively, of flip-flop $F_1$. Further, the output $Q_1$ and timing pulse $t_d$ are supplied to an AND circuit $A_3$, and the output of the latter is imparted to set terminal $s$ of a flip-flop $F_2$. The output $\overline{Q}_1$ and timing pulse $t_d$ are applied to an AND circuit $A_4$, and the output of the latter is supplied to reset terminal $r$ of the flip-flop $F_2$. Thus, an output $Q_2$ is obtained at a "NOT" output terminal of flip-flop $F_2$. Furthermore, such output $\overline{Q}_2$, the output $Q_1$ and an output J representing the presence of the minus symbol "—" output are imparted to an AND circuit AD, and the output $Q_1 \cdot \overline{Q}_2 \cdot J$ of the latter is supplied to the display unit 7.

Figure 1B:
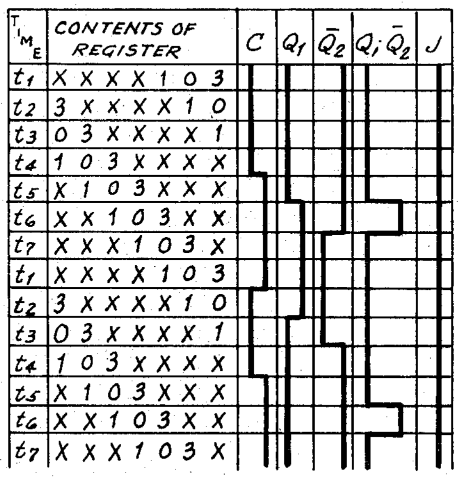
FIG. 1B is a table showing timed relationships in the system of FIG. 1A.

With such arrangement, the relationships of the outputs C, $Q_1$, $\overline{Q}_2$, $Q_1$, $\overline{Q}_2$ and J to the content of the register 5 are as shown on the table of FIG. 1B so that the display device 7 is made to display "    —    103" with the minus sign "—" in the fifth digit position, instead of "—    103," that is, with the minus sign in the seventh digit position.

More specifically, it will be understood that the codes representing the contents of register 5 appear in the output of the latter in ascending order of the significance of the respective digit positions, that is, as previously noted for the example given, in the order "3," "0," "1," "X," "X," "X" and "X." Further, the codes for "3," "0," "1," "X," "X," "X" and "X" appear in the register output supplied to display device 7 and detector 8 in the digit times $t_2$, $t_3$, $t_4$, $t_5$, $t_6$, $t_7$ and $t_1$, respectively, and display device 7 decodes only the non-redundancy codes for "3," "0" and "1" to display the respective digits at the 1st, 2nd and 3rd digit positions, respectively. Since the codes representing the digits "3," "0" and "1" to be displayed at the 1st, 2nd and 3rd digit positions of display device 7 occur in the register output at the digit times $t_2$, $t_3$ and $t_4$, it is apparent that the minus symbol "—" will be made to appear at the 5th digit position of device 7, as here desired, only if the display device is made to decode the code representing the symbol "—," as supplied thereto from the encoder 2, during the digit time $t_6$.

The display device 7 is made to decode the code representing the symbol "—" by the supplying of the output of AND circuit AD thereto when the outputs $Q_1$ and $\overline{Q}_2$ exist simultaneously during the presence of the signal J indicating that a symbol-representing code is being supplied. Thus, when a symbol-representing code is being supplied by encoder 2 to display device 7, the latter decodes the symbol representing code in a digit time when flip-flop $F_1$ is in its set condition and flip-flop $F_2$ is in its reset condition to provide the outputs $Q_1$ and $\overline{Q}_2$ respectively.

As shown on FIG. 1B, the effects of the circuits illustrated by FIG. 1A is to delay, by one digit time after the detection of a redundancy code X in the register output, the switching of flip-flop $F_1$ from its reset condition to its set position to provide output $Q_1$, and further to delay, by one digit time after the switching of flip-flop $F_1$ from its reset condition to its set condition, the switching of flip-flop $F_2$ from its set condition to its reset condition, whereby the digit time when $Q_1$ and $\overline{Q}_2$ exist simultaneously to cause display device 7 to display the symbol "—" will be two digit times later than the digit time when detector 8 first detects the presence in the register output of a redundancy code X representing a futile "0."

In the example given and illustrated by the table of FIG. 1B, the output $\overline{C}$ corresponding to non-redundancy codes in the register output is produced by detector 8 through digit time $t_4$, and the output C corresponding to the detection of redundancy codes X occurs during the digit times $t_5$, $t_6$ and $t_7$ of a word cycle and during the digit time $t_1$ of the next word cycle. Since the output of AND circuit $A_1$ is available to set flip-flop $F_1$ and provide the output $Q_1$ from the later only upon signal $t_d$ in the last bit of digit time $t_5$, the output $Q_1$ will commence in digit time $t_6$ and continue until flip-flop $F_1$ is reset by the output from AND circuit $A_2$ commencing in the last bit of digit time $t_1$ of the next word cycle.

Prior to digit time $t_5$, the feeding of the output $\overline{C}$ to AND circuit $A_2$ causes the output of the latter to dispose flip-flop $F_1$ in its reset condition so that the output $\overline{Q}_1$ of flip-flop $F_1$ is available to AND circuit $A_4$ and the output of the latter causes flip-flop $F_2$ to be in its reset condition for providing the output $\overline{Q}_2$.

The setting of flip-flop $F_2$ by the output from AND circuit $A_3$ occurs at the last bit of the digit time $t_6$ during which output $Q_1$ first appears, and thus flip-flop $F_2$ is set, to discontinue its output $\overline{Q}_2$, during digit time $t_7$ and digit time $t_1$ of the next word cycle. It will be apparent from the foregoing that the outputs $Q_1$ and $\overline{Q}_2$ exist simultaneously only during digit time $t_6$, so that the output of AND circuit AD is available only during that digit time $t_6$ to cause display device 7 to display the symbol "—" at the 5th digit position, as here desired.

It will be noted that the timing pulse $T_7$ is produced simultaneously with the occurrence in the register output of the content of the 7th digit portion of register 5, and hence is coincident with the digit time $t_1$ on the table of FIG. 1B. Thus, if the number to be displayed occupies six digit positions in register 5 so that detector 8 first detects a redundancy code X to provide output C in digit time $t_1$, the NOT output $\overline{T}_7$ is not simultaneously available to provide an output from AND circuit $A_1$ for setting flip-flop $F_1$. Accordingly, output $Q_1$ is not obtained and no signal is provided from AND circuit AD to display device 7 to cause the latter to display the symbol. In the absence of the foregoing, the circuit of FIG. 1A would provide an output from AND circuit AD to display device 7 in the digit time $t_2$ of the second and subsequent word cycles so as to cause device 7 to display the symbol "—" or other symbol at the 1st digit position which is intended to display the digit at the 1st digit position in the number to be displayed and thus cause an overflow.

Figure 2A:
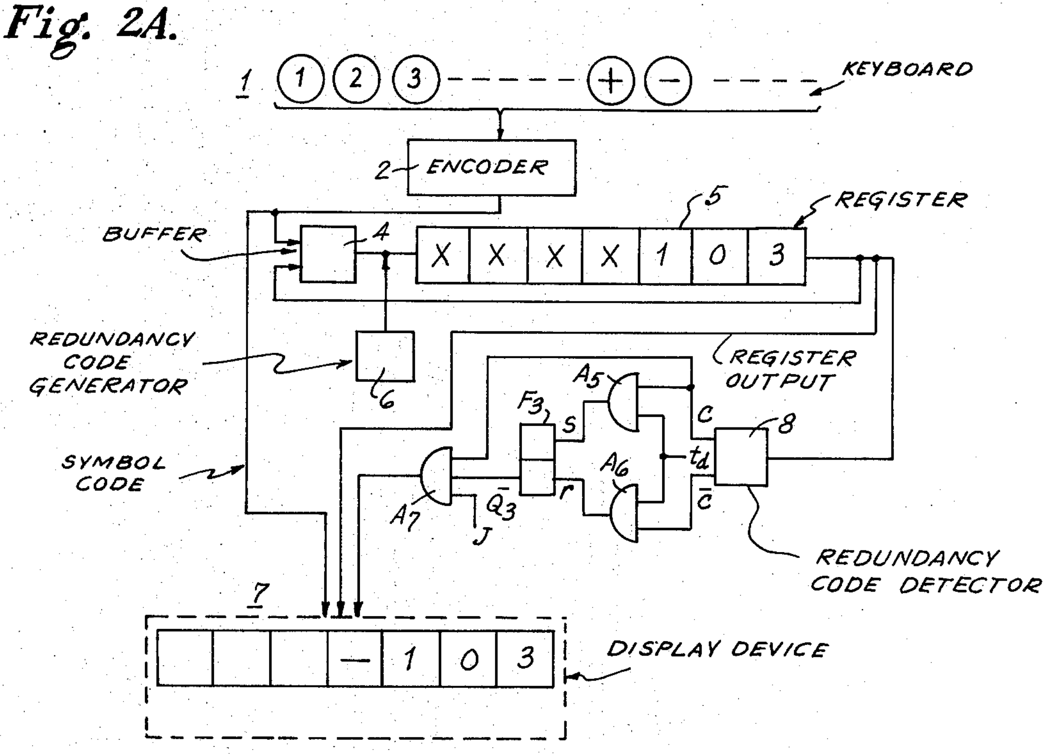
FIG. 2A is a block diagram of a number and symbol display system for electronic computers in accordance with a second embodiment of this invention.

The logic circuits adapted to cause the minus symbol "—" to be displayed at the digit position higher by one digit than that of the most significant digit of a displayed effective number, that is, at the fourth digit position in the given example will now be described with reference to FIG. 2A. As shown in FIG. 2A, outputs C and $\overline{C}$ are produced by the redundancy code detecting circuit 8 in the same manner as described above with reference to FIG. 1A. The output C and timing pulse $t_d$ are applied to an AND circuit $A_5$, and the output of the latter is imparted to set terminal *s* of a flip-flop $F_3$. The output $\overline{C}$ and timing pulse $t_d$ are supplied to an AND circuit $A_6$, and the output of the latter is applied to reset terminal *r* of the flip-flop $F_3$. Thus, an output $\overline{Q}_3$ is available at a "NOT" output terminal of the flip-flop $F_3$ when the latter is in its reset condition. Subsequently, the outputs $\overline{Q}_3$, C and J are applied to an AND circuit $A_7$, and the ouput $C.\overline{Q}_3.J$ of the latter is supplied to the display unit 7 to control the digit position at which the latter displays the symbol.

Figure 2B:
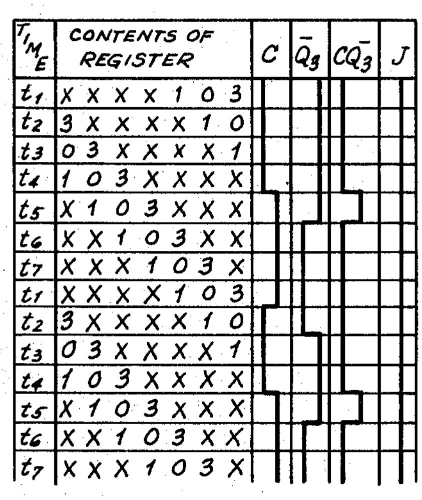
FIG. 2B is a table showing timed relationships in the system of FIG. 2A.

With the arrangement just described, the relationships of the outputs C, $\overline{Q}_3$, $C.\overline{Q}_3$ and J to the content of register 5 are as shown on the table of FIG. 2B, so that display unit 7 is made to display "    —103" with the minus sign "—" in the fourth digit position.

It will be apparent that, with the arrangement of FIG. 2A, the display device 7 is made to decode the code representing the symbol "—" by the supplying of the output of AND circuit $A_7$ thereto when the outputs C and $\overline{Q}_3$ exist simultaneously during the presence of the signal J indicating that encoder 2 is supplying a symbol-representing code to the display device. As shown on FIG. 2B, the effect of the circuits illustrated by FIG. 2A is to delay, by one digit time after the occurrence of output C in response to the detection of a redundancy code X, the setting of flip-flop $F_3$ so that the output $\overline{Q}_3$ from flip-flop $F_3$ exists simultaneously with the output C during the digit time when a redundancy code X is first detected in the register output. In the example given, output C first occurs in digit time $t_5$ and flip-flop $F_3$ is switched to its set condition in digit time $t_6$ so that outputs C and $\overline{Q}_3$ exist simultaneously in digit time $t_5$, as shown on FIG. 2B.

Since the codes representing "3," "0" and "1" appear in the register output at digit times $t_2$, $t_3$ and $t_4$ to cause the device 7 to display digits "3," "0" and "1" at its 1st, 2nd and 3rd digit positions, it is apparent that the occurrence of the output $C.\overline{Q}_3.J$ from AND circuit $A_7$ in the digit time $t_5$ will cause display device 7 to display the symbol "—" in the 4th digit position, as desired.

Figure 3:
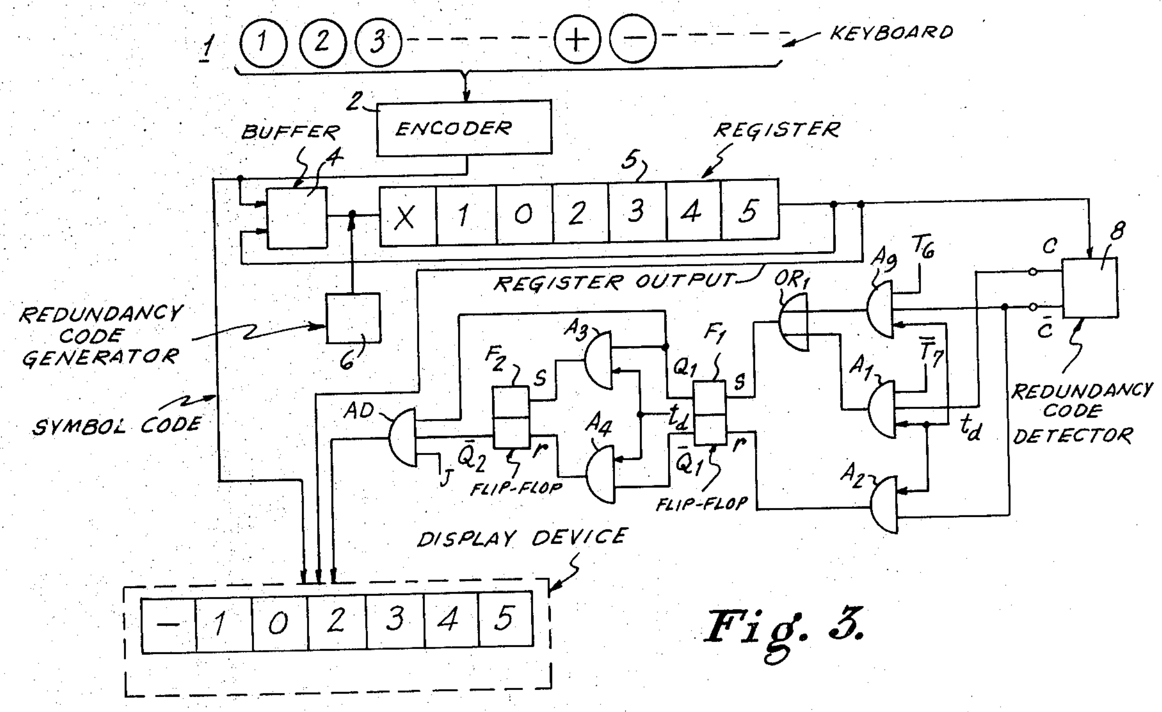
FIG. 3 is a block diagram showing a number and symbol display system which is a modification of that illustrated by FIG. 1A.

In the case where the number of digit portions of register 5 is seven and the number of digit portions of the display unit 7 is also seven, as shown, the maximum number of digits that can be contained in the displayed effective number is six, since one of the seven digit positions is allotted to the indication of a symbol. Therefore, in the case where the effective number to be displayed contains six digits, a symbol cannot be displayed due to overflow, if an attempt is made to indicate the symbol in a digit position higher by two digits than that of the most significant digit of the displayed effective number, as described above in connection with FIG. 1A. To avoid this, the arrangement of FIG. 1A may be modified as shown in FIG. 3. In such modified arrangement, there are supplied to an AND circuit $A_9$ the output $\overline{C}$ of the redundancy code detecting circuit 8, a timing pulse T occurring earlier by one-digit time that the timing pulse $T_7$, and the timing pulse $t_d$, and the output of the AND circuit $A_9$ is supplied to the set terminal *s* of flip-flop $F_1$ through an OR circuit $OR_1$ provided between AND circuit $A_1$ and the set terminal *s* of flip-flop $F_1$. Parts of FIG. 3 corresponding to those of FIG. 1A are identified by the same reference letters and numerals, and further description thereof will be omitted.

The modified arrangement of FIG. 3 operates the same as the system described above with reference to FIG. 1A so long as the effective number to be displayed has no more than five digits, in which case the symbol "—" is displayed by device 7 at a digit position higher by two digit positions than that of the most significant digit of the displayed effective number. However, when the effective number to be displayed has six digits, for example, the number "—102345" as shown, the symbol "—" is displayed at the digit position one digit position higher than that of the most significant digit of the displayed number, that is, at the 7th digit position of the display device which is not occupied by a displayed digit. The foregoing results from the fact that, if a digit to be displayed is encoded in the sixth digit portion of register 5, the respective digit-representing code is detected by detector 8 to provide the output $\overline{C}$ in the same digit time as the occurrence of timing pulse $T_6$, whereby the output of AND circuit $A_9$ is passed through OR circuit $OR_1$ and sets flip-flop $F_1$ to provide output $Q_1$ at a digit time that is one digit time earlier than that at which output C would be supplied to AND circuit $A_1$ to indicate the redundancy code X at the 7th digit position in the register output. Thus, output $Q_1$ and output $\overline{Q}_2$ exist simultaneously in the digit time immediately following that in which the code for digit "1" to be displayed at the 6th digit position is supplied to device 7, whereby the output of AND circuit AD causes device 7 to display the symbol "—" at the 7th digit position.

With any of the arrangements shown in FIGS. 1A, 2A and 3 however, symbol indication cannot be achieved when overflow occurs, that is, when the number of effective digits to be displayed is seven or more. In order to solve this problem, the arrangements of FIGS. 1A, 2A and 3 may be modified as shown on FIGS. 4, 5 and 6, respectively, wherein the timing pulse $T_7$, an overflow output OV and output J are imparted to an AND circuit $A_{10}$ the output of which is supplied to the display device 7, thereby making it possible to indicate a symbol at the seventh digit position even when overflow occurs. For example, "—1023456" is displayed as "—023456."

Figure 4:
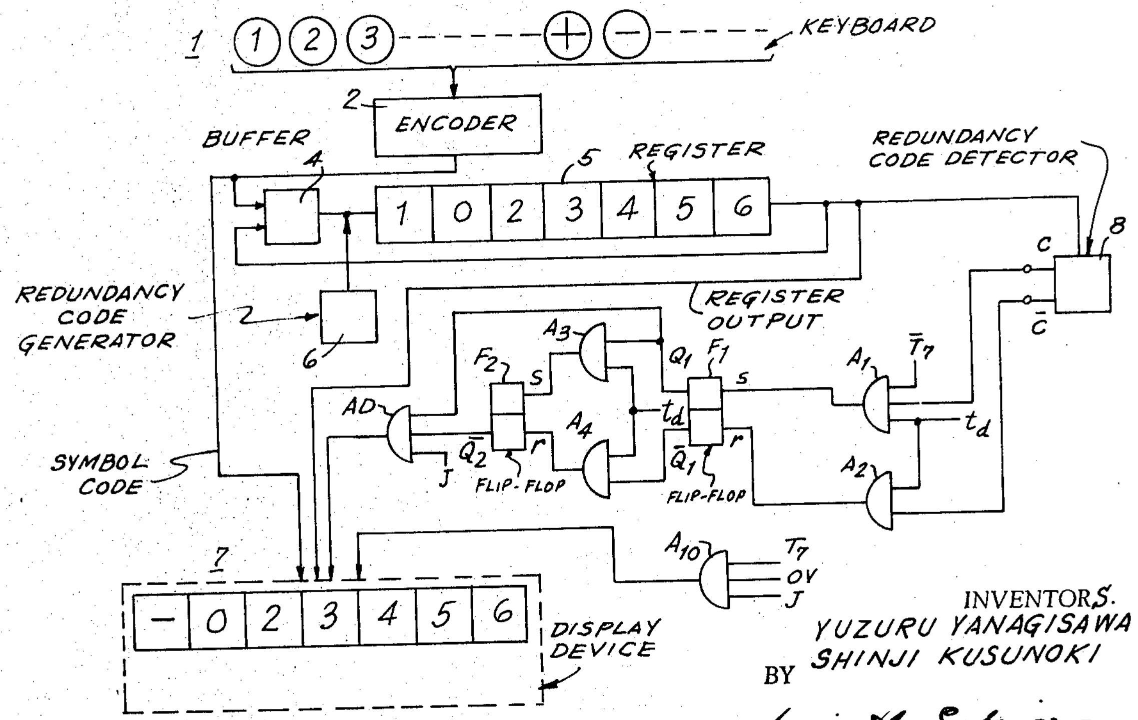
FIGS. 4, 5 and 6 are block diagrams showing modifications of the number and symbol display systems of FIGS. 1A, 2A and 3, respectively.
Figure 5:
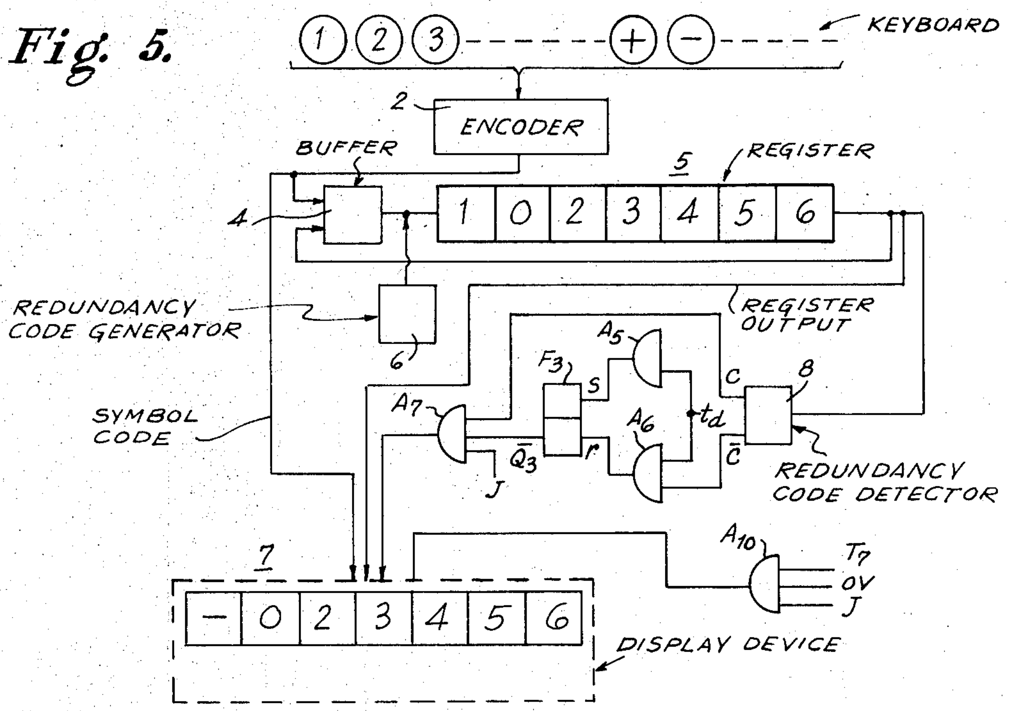
Figure 6:
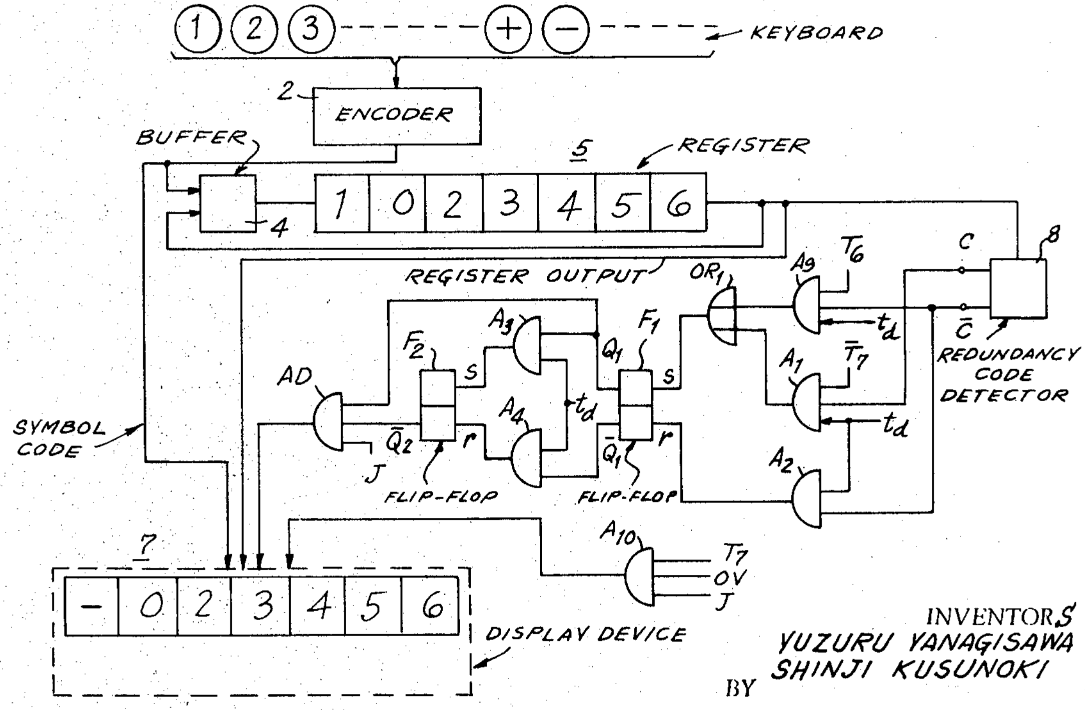

The systems of FIGS. 4, 5 and 6 operate in the same manner as the systems described above with reference to FIGS. 1A, 2A and 3, respectively, so long as the number of effective digits to be displayed is less than seven. However, when the effective number to be displayed has seven or more digits and a symbol code is supplied to display device 7, the signal J and overflow signal OV are supplied simultaneously with the timing pulse $T_7$ to provide the output from AND circuit $A_{10}$ to device 7, whereby the latter is controlled to avoid the display of the digit "1" represented by the code appearing in the register output at the same digit time as timing pulse $T_7$, and instead is made to display the symbol "—" at the 7th digit position.

In the foregoing, arrangements have been described in which the redundancy code X was substituted for futile or insignificant "0's" in the register 5. However, similar arrangements may be provided in which the redundancy code X is substituted for necessary "0's," but not for futile or insignificant "0's," to convert the content or register 5 to, for example, "00001X3." In the latter cases, the "0" content is not decoded in the display unit 7 but the redundancy code X is decoded as "0" content therein. Thus, a display similar to that described above can be produced by admitting the redundancy code X from the redundancy code generating circuit 6 to the register 5 instead of the coded output representing "0" when "0" content is present in the output of key board 1, with the redundancy code generating circuit 8 being then constituted as a "0" code detecting circuit.

The present invention will now be described as applied to a system in which the result of a computation effected by a computer is entered into a register and the content of such register is sequentially supplied to a display device.

Figure 7A:
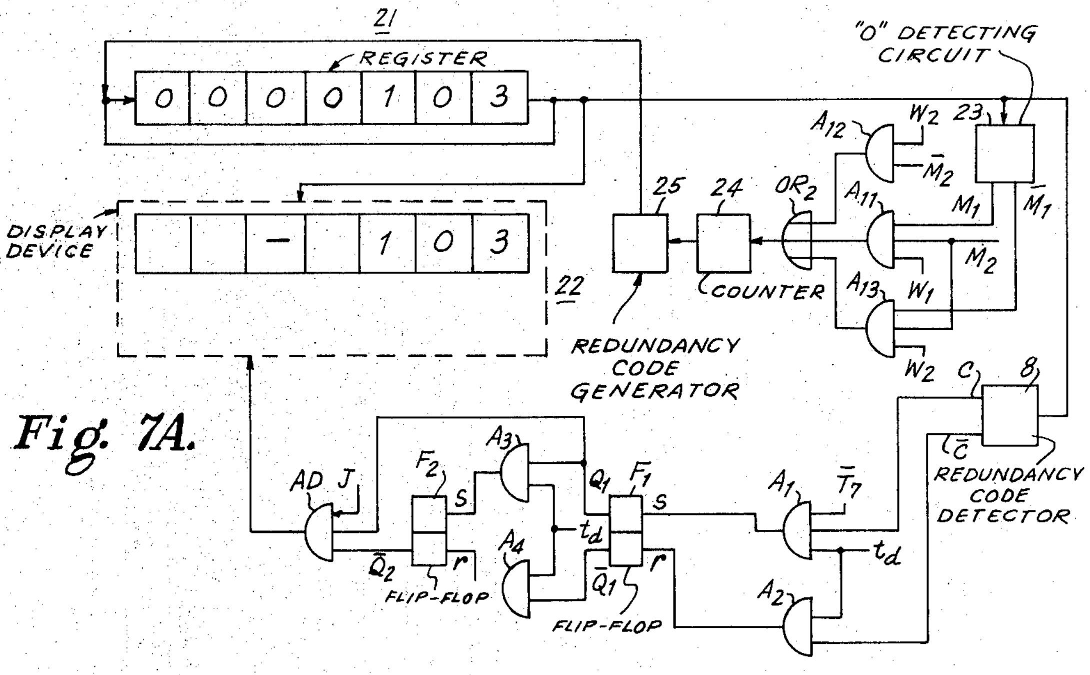
FIG. 7A is a block diagram illustrating a number and symbol display system according to another embodiment of the invention.

More specifically, in the system of FIG. 7A, the reference number 21 represents a numerical register the content of which is sequentially admitted to a display device 22 and decoded in the latter so that it is sequentially displayed on the display device 22. Assuming that the number of digit portions of register 21 is seven and that the computed result is "—10.3," the content of the register 21 is "000010.3." Thus, if the output of register 21 representing such content is imparted as is to the display device 22, then a display of "—00010.3" is produced by the display unit.

However, in accordance with the present invention, logic circuits are provided to make possible the display of "    — 10.3" or "    —10.3," as will be described below.

In the system of FIG. 7A according to the invention, the content sequentially taken from the register 21 is admited to a "0" detecting circuit 23 which in turn provides a "0" detection output $M_1$ and a non-zero detection output $\overline{M}_1$.

Supplied to an AND circuit $A_{11}$ are the output $M_1$, a signal $W_1$ occurring for the first word period of the register 21 and a signal $M_2$ occurring upon arrival of a decimal point timing signal $T_P$. The output of AND circuit $A_{11}$ is supplied through an OR circuit $OR_2$ to a counter 24 which thereby counts the number of "0's" at positions higher than that of the decimal point in the content of the register 21. Further, a signal $W_2$ occurring during the second word period and "NOT" output $\overline{M}_2$ of the output $M_2$ are supplied to an AND circuit $A_{12}$, and the output of latter is imparted through the OR circuit $OR_2$ to the counter 24 by which the latter counts the number of digits (including "0") at positions lower than that of the decimal point in the content of the register 21. Also, the output $\overline{M}_1$, signal $W_2$ and output $M_2$ are supplied to an AND circuit $A_{13}$ and the output of the latter is in turn supplied through OR circuit $OR_2$ to the counter 24 by which the latter counts the number of digits excluding "0" at positions higher than that of the decimal point in the content of the register 21. The counter 24 is designed to be operated by a count pulse which arrives first after the output of OR circuit $OR_2$ is imparted thereto.

Figure 7B:
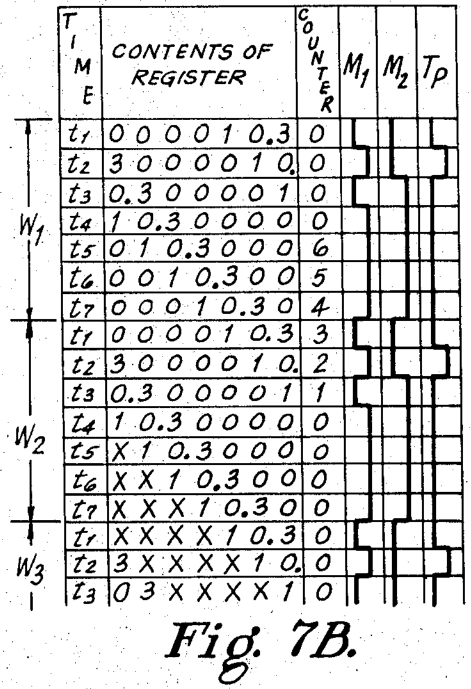
FIG. 7B is a table showing timed relationships in the system of FIG. 7A.

When the content of counter 24 becomes "0," redundancy code X available from a redundancy code generating circuit 25 is supplied to the input side of register 21 during the subsequent digit times to complete the second word period, whereby to replace each futile "0" with redundancy code X at the commencement of the third word period. With the foregoing arrangement, the relationships of the content of counter 24, outputs $M_1$ and $M_2$ and decimal point timing pulse $T_P$ to the content of the register 21 are as shown in the table of FIG. 7B, so that the content of the register 21 becomes "XXXX10.3" during the word periods beginning with the third word period $W_3$.

Such content of the register 21 is sequentially supplied to display unit 22 as a serial input of "3"–"0"–"1"–"X"–"X"–"X"–"X." If the number of digit portions of display unit 22 is seven, the display based on the output of register 21 is effected so that "3," "0" and "1" are indicated at the 1st, 2nd and 3rd digit positions, respectively, since the redundancy code X is not decoded in display unit 22. Thus, the display of "10.3" is produced, without indicating futile "0's" at 4th to 7th digit positions.

In this case, however, since the computed result is "—10.3," the content representing the symbol "—" is also supplied to display unit 22. Further, the display unit 22 is controlled by the output of logic circuits which may be the same as those described above in connection with FIG. 1A or FIG. 2A so that the minus symbol "—" is indicated at either the 5th digit position or the 4th digit position, respectively. Consequently, the display is produced as either "    — 10.3" or as "    —10.3."

In FIG. 7A, logic circuits similar to those described above in connection with FIG. 1A are connected with register 21. The arrangement of FIG. 7A operates in the same manner as has been described above in connection with the table of FIG. 1B during the word periods beginning with the third word period, thus resulting in the display of "    — 10.3." Parts of FIG. 7A corresponding to those shown on FIG. 1A are identified by the same reference numerals and letters, and further description thereof will be omitted.

Figure 8:
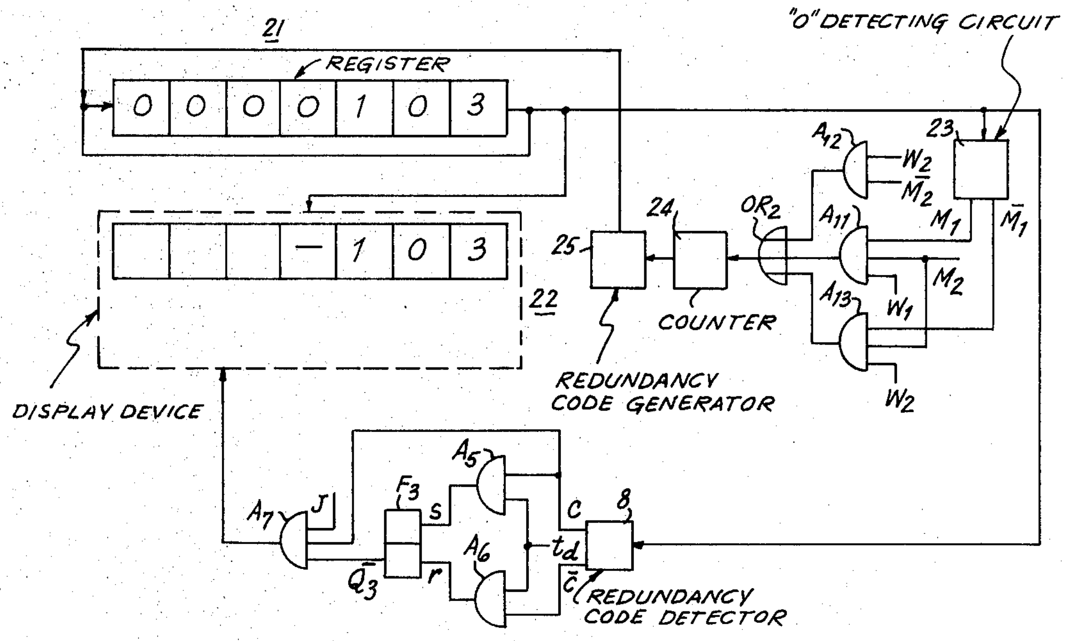
FIGS. 8, 9, 10, 11 and 12 are block diagrams respectively showing number and symbol display systems according to further embodiments of the invention.

In FIG. 8, the logic circuits described above in connection with FIG. 2A are connected with register 21 to operate in the same manner as described with reference to the table of FIG. 2B, thus resulting in the display of "    —10.3."

Figure 9:
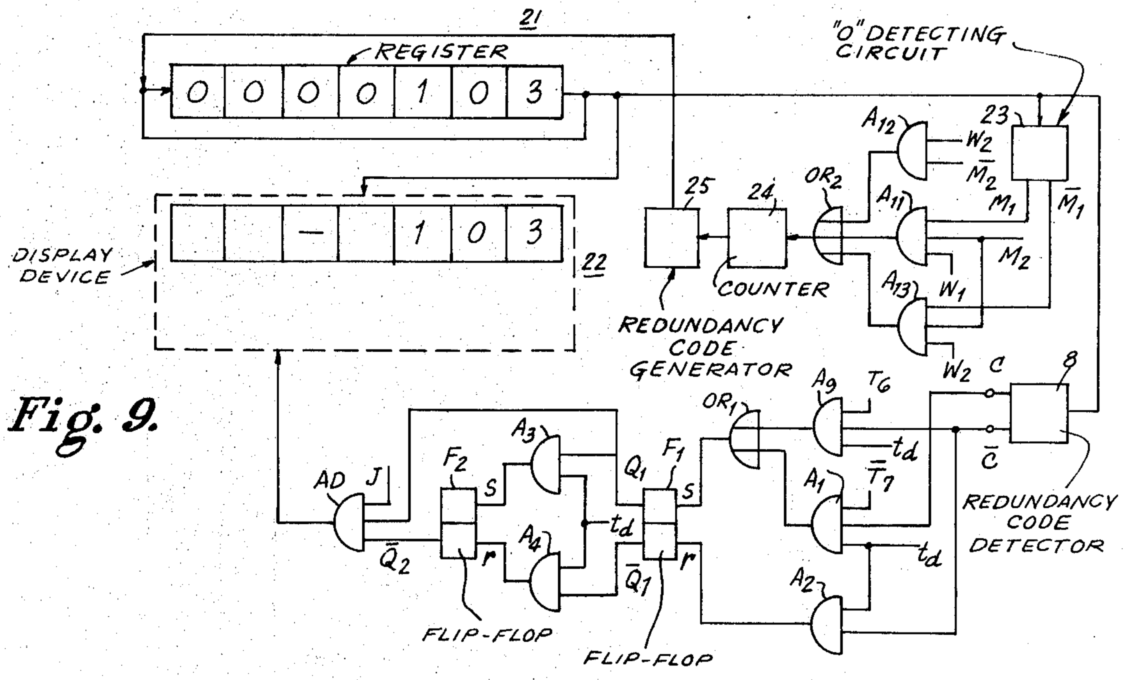

With the FIG. 7A arrangement, the symbol indication cannot be achieved in the cases where the number of effective digits to be displayed is six, that is, only one less than the digit portions of display device 22. To be able to achieve such symbol indication, the arrangement of FIG. 7A may be modified as shown in FIG. 9, that is, in the same manner that the arrangement of FIG. 1A has been modified to provide the arrangement of FIG. 3. Parts of the arrangement of FIG. 9 corresponding to those shown on FIGS. 3 and 7A are indicated by the same reference numerals and letters, and further description thereof will be omitted.

Figure 10:
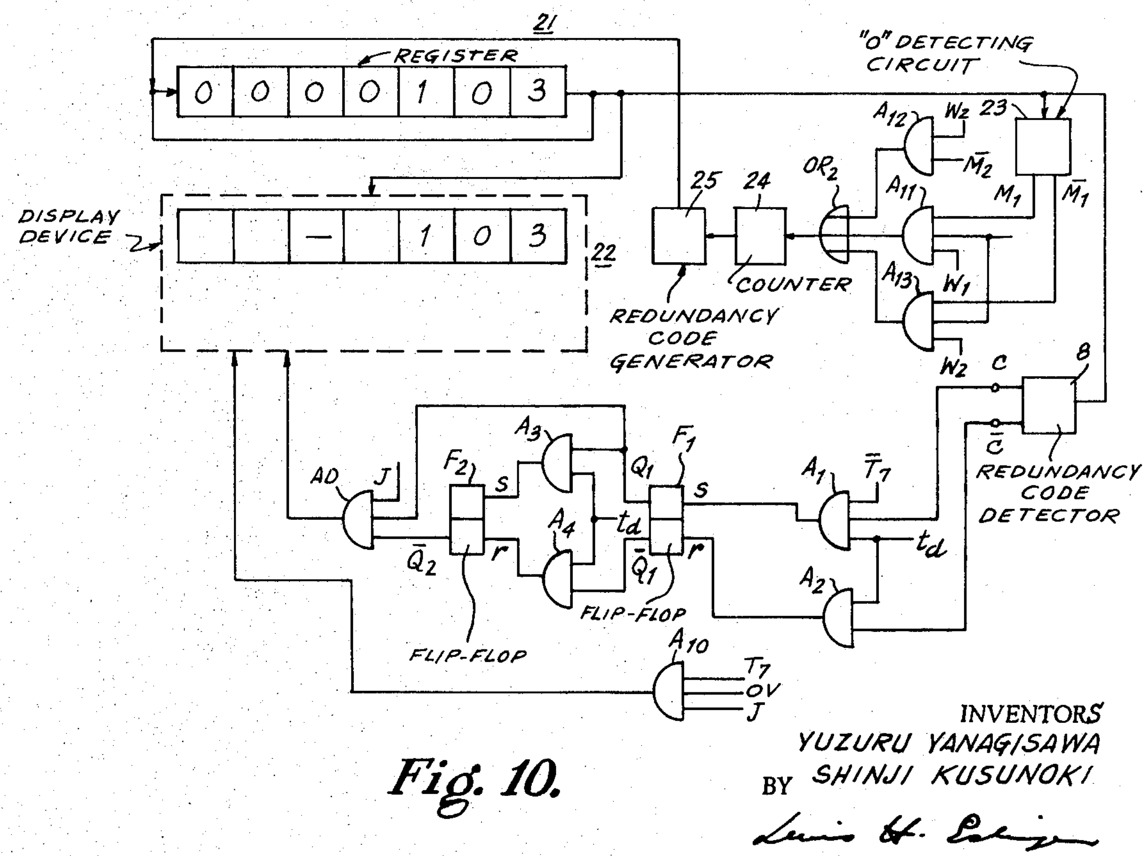
Figure 11:
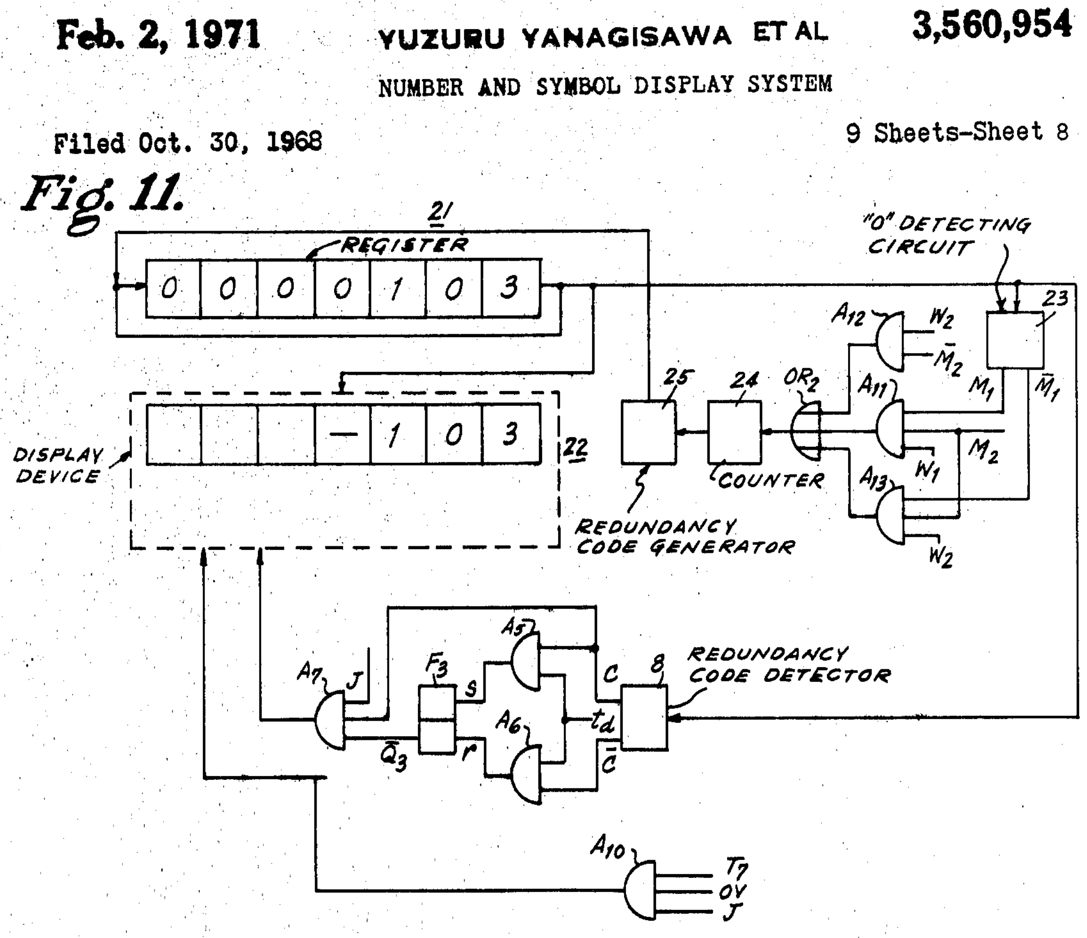
Figure 12:
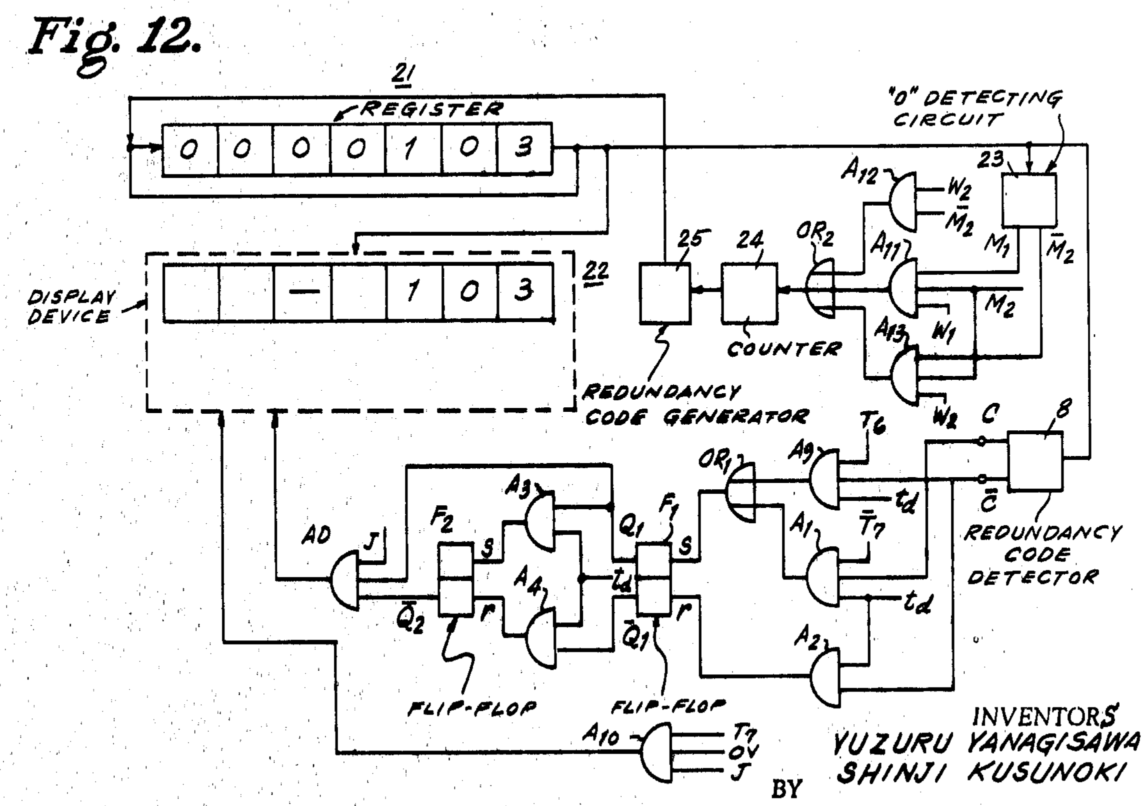

With the arrangements of FIGS. 7A, 8 and 9, symbol indication cannot be produced when overflow occurs, as described above in connection with FIGS. 1A and 2A. To be able to achieve such symbol indication irrespective of overflow, the arrangements of FIGS. 7A, 8 and 9 may be modified as shown in FIGS. 10, 11 and 12, respectively, in the same manner as the arrangements of FIGS. 1A, 2A and 3 were modified to provide the arrangements of FIGS. 4, 5 and 6, respectively. Parts shown on FIGS. 10, 11 and 12 which correspond to parts shown on FIGS. 4, 5, 6, 7A, 8 and 9 are identified by the same reference letters and numerals, and further description thereof will be omitted.

Figure 13:
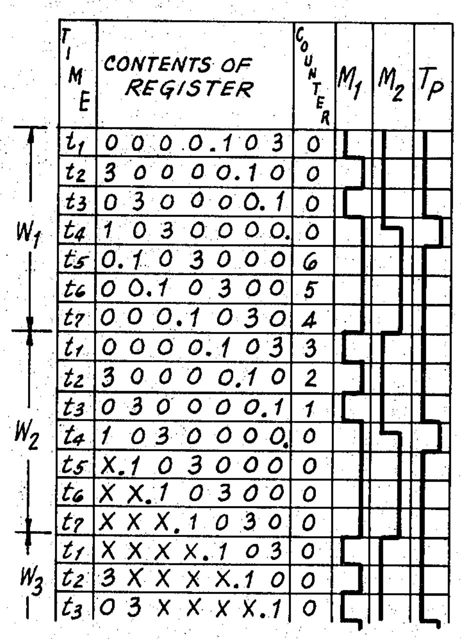
FIGS. 13, 14, 15 and 16 are tables showing timed relationships for various modifications of number and symbol display systems according to the invention.
Figure 14:
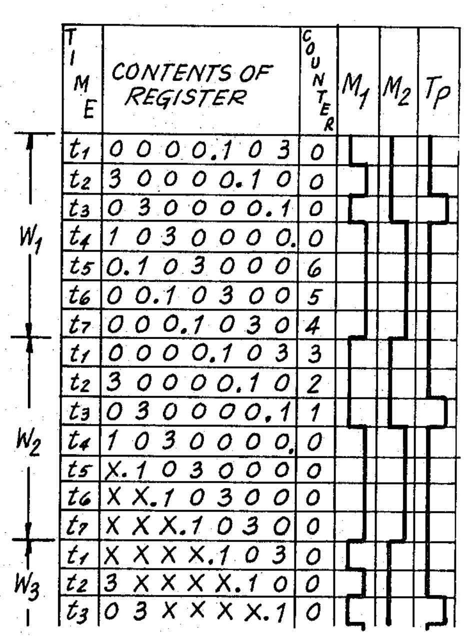

With the arrangements of FIGS. 7A–12, a computed result of "——————.103" for example, would be displayed as "    — 0.103" or "    —0.103," that is, a "0" would be displayed at the position higher by one digit than that of the decimal point. In order to produce a display such as "    — .103" or "    — .103" without indicating such "0," either the outputs $M_2$ and $\overline{M}_2$ may be both produced within the period of time corresponding to the width of the timing pulse $T_P$, as represented by the table of FIG. 13, or the timing pulse $T_P$ per se may be produced earlier by one digit time than in the above case, as represented by the table of FIG. 14. Thus, in either case, operations can be performed in a manner similar to that described with reference to FIGS. 7A and 7B, and yet "0" can be prevented from being indicated at the position higher by one digit than that of the decimal point.

Displays similar to those described above with reference to FIG. 7A can be produced with an arrangement wherein, when the content of the register 21 is "000010.3," as in the above case for example, it is converted to "00001X.3" by replacing the necessary "0" by the redundancy code X and the "0" content is not decoded in the display device 22 but the redundancy code X is decoded as content representing "0."

When the arrangement of FIG. 7A is thus modified, "0" content occurring at the output side of register 21, from the start of the second word period $W_2$ to a point in time within the second word period when the content of counter 24 is reduced to "0," is replaced by redundancy code X which is supplied to the input of register 21 from generator 25. However, after the content of counter 24 is reduced to "0" during the second work period $W_2$, "0" content or codes appearing at the output of register 21 are not replaced by redundancy codes, but rather are shifted as "0" codes to the input side of the register.

Figure 7C:
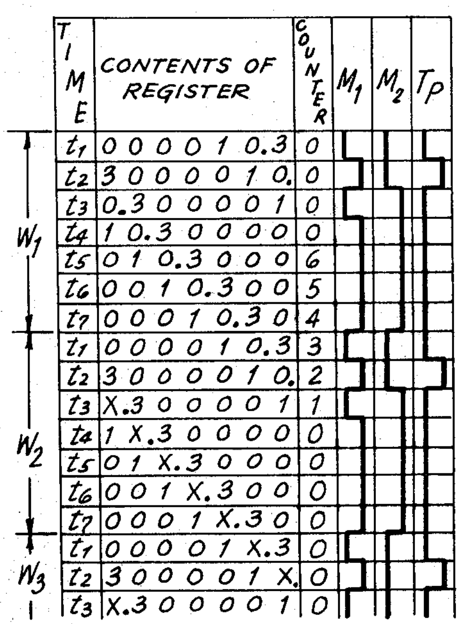
FIG. 7C is a table similar to that of FIG. 7B, but for a modification of the system of FIG. 7A.

For example, as shown on the table of FIG. 7C, counter 24 is operated, as described above with reference to FIG. 7A, to reduce the content of the counter to "0" at the time $t_4$ in the second word period $W_2$. From the start of the second word period $W_2$ until the time $t_4$ thereof when the counter content becomes "0," the redundancy code generator 25 is made operative to replace with redundancy code X and "0" code appearing in the output of register 21. The only "0" code appearing at the output of register 21 in such period when generator 25 is operative, is the "0" at the digit position immediately above the decimal point and which enters the output in time $t_3$ of the second word period so as to be replaced by redundancy code X, as shown.

After the content of the counter 24 is reduced to zero in the second word period, generator 25 is rendered inoperative and, therefore, for the remainder of the second word period and thereafter, and "0" codes appearing at the output of register 21 are shifted to the input of the latter without being replaced by redundancy codes X. Thus, as shown, at the end of the second word period, the content of register 21 is "00001X.3." Of course, when the foregoing conversion of the content of register 21 is effected, the detector 8 of FIG. 7A is made to detect the presence of "0" codes in the register output, that is, to provide the output C when a "0" code is detected and to provide the output $\overline{C}$ whenever a redundancy code X or a code representing a digit other than "0" is detected.

Figure 16:
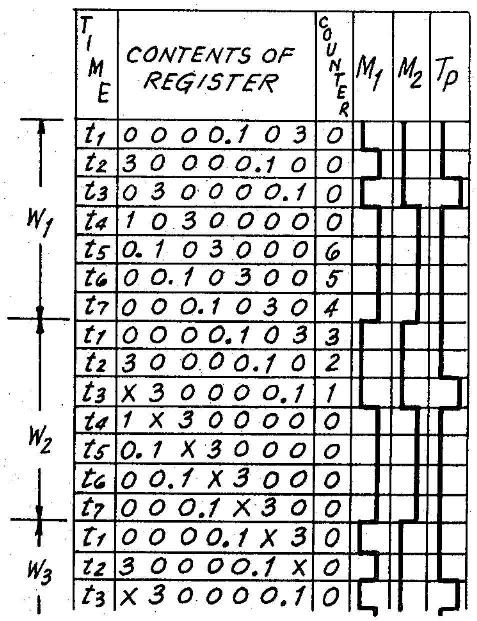
Figure 15:
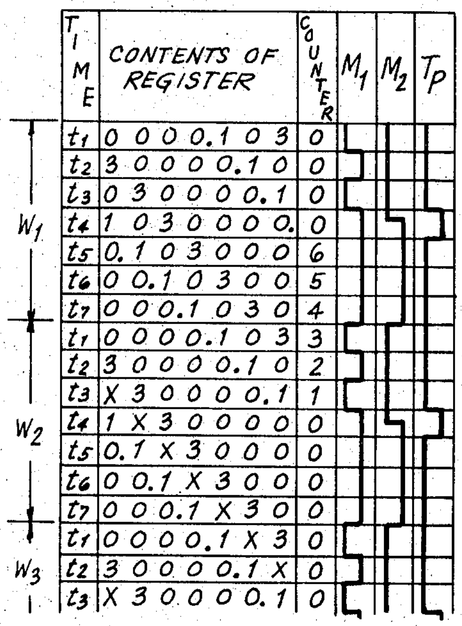

The tables of FIGS. 15 and 16 illustrate the operations of systems like that described above with reference to FIG. 7C, but in which the outputs $M_2$ and $\overline{M}_2$ are both produced within the time period of the decimal point timing pulse $T_P$, as described with reference to FIG. 13, or the occurrence of pulse $T_P$ is advanced one digit time, as described above with reference to FIG. 14, respectively. Thus, in each of the systems represented by FIGS. 15 and 16, a register content of, for example, "0000.103" is converted to "0000.1X3" at the end of the second word period, and such content is decoded in the associated display device as ".103" with a symbol, such as "—," if required, appearing either at the digit position one digit position higher than the decimal point or two digit positions higher than the decimal point.

In the foregoing, illustrative embodiments of the invention have been described with respect to particular examples wherein a relatively small number with the minus symbol are to be displayed. However, it is to be understood that this has been only for convenience of explanation and by way of example only, and it will be readily apparent to those skilled in the art that the present invention can be applied to the display of any number with any kind of symbol. It will also be apparent that there are no limitations upon the numbers of digit portions of the register and display device. Further, in the foregoing, description has been made of the preferred case where a sign or symbol is indicated or displayed at a position higher by one or two digit positions than that of the most significant digit of the displayed effective number. However, it will be appreciated that such sign or symbol may be displayed at a position more than two digit positions higher than that of the most significant digit of a displayed effective number in those cases where such positioning of the displayed symbol will facilitate the reading of the symbol or the displayed number.

Having described various embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A number and symbol display system for an electronic computer, comprising a register having a plurality of digit portions, means for applying to said register codes respectively representing the digits of an effective number to be displayed and for distinguishing the codes representing any futile "0's" in digit positions higher than that of the most significant digit of said effective number from the codes representing any "0's" in the effective number to be displayed, a display device having a plurality of digit portions each capable of displaying selectively any digit of a number and a symbol, means for supplying a symbol code to said display device, means for sequentially supplying to said display device the output of said register in which the codes from the digit portions of said register in ascending order of significance appear at successive digit time positions, said display device being operative, upon receiving a sequentially supplied register output, to display at respective digit portions of the display device the digits of said effective number represented by said respective codes in said register output and to avoid display of any futile "0's" represented by the distinctive code therefor in said register output, detecting means for the detection of said distinctive code representing futile "0's" in said register output, means responsive to the detection of said distinctive code to provide a a control output signal at a digit time position that is later by a predetermined number of digit times than the digit time position of said most significant digit of the effective number as determined by said detected distinctive code, and means for supplying said control output signal to said display device to cause the latter to display the symbol represented by said symbol code in the digit portion of said display device that is at a digit position higher by said predetermined number of digit positions than the digit position of the most significant digit of the displayed effective number.

2. A number and symbol display system according to claim 1, in which said predetermined number of digit times is from one to two, inclusive.

3. A number and symbol display system according to claim 2, in which said means for applying said codes to said register includes redundancy code generating means, means for applying said redundancy code to said register from said generating means at the digit portions of said register other than those receiving the codes representing the digits of said effective number to be displayed, said detecting means detecting the presence in said register output of said redundancy code.

4. A number and symbol display system according to claim 2, in which said means for applying said codes to said register includes redundancy code generating means, means for applying said redundancy code to said register from said generating means in place of the code representing "0" for each "0" present in said effective number to be displayed, said detecting means detecting the presence in said register output of said code representing "0."

5. A number and symbol display system according to claim 2, in which said means for applying the codes to said register includes a key board having manually actuable keys corresponding to various digits and symbols, respectively, encoding means operative in response to actuation of said keys to provide said codes representing digits of the effective number to be displayed and which are fed sequentially to said register and said symbol code which is fed to said display device, and redundancy code generating means feeding redundancy code to said register to occupy the digit portions of the latter other than those occupied by said codes representing digits of the effective number to be displayed, and in which said detecting means detects the presence in said register output of said redundancy code.

6. A number and symbol display system according to claim 2, in which said means for applying the codes to said register includes a key board having manually actuable keys corresponding to various digits and symbols, respectively, encoding means operative in response to actuation of said keys to provide codes representing digits other than "0" of the effective number to be displayed and codes representing futile "0's" and which are fed sequentially to said register to occupy respective digit portions of the latter and also to provide said symbol code which is fed to the display device, and redundancy code generating means feeding redundancy code to said register to occupy each digit portion of the latter at which a "0" of the effective number is to be contained, and in which said detecting means detects the presence in said register output of said codes representing futile "0's."

7. A number and symbol display system according to claim 2, in which said register initially contains codes representing said digits of the effective number to be displayed at the respective digit portions of the register and codes representing "0" at the other digit portions of the register, in which said means for distinguishing the codes representing futile "0's" from the codes representing "0's" in said effective number includes redundancy code generating means and means for detecting codes representing futile "0's" in the output of said register at digit times corresponding to the contents of said other digit portions of the register and for controlling said generating means so as to cause the latter to substitute redundancy code for said code representing futile "0's" in each of said other digit portions of the register, and in which said detecting means detects said redundancy code in the register output after the substitution of said redundancy code for each said code representing a futile "0."

8. A number and symbol display system according to claim 2, in which said register initially contains codes representing said digits of the effective number to be displayed at the respective digit portions of the register and codes representing "0" at the other digit portions of the register, in which said means for distinguishing the codes representing futile "0's" from the codes representing "0's" in said effective number includes redundancy code generating means and means for detecting codes representing said "0's" in the effective number and for controlling said generating means so as to cause the latter to substitute redundancy code for each said code representing "0" in said digit portions of the register which contain codes representing said digits of the effective number to be displayed and in which said detecting means detects said code representing "0" in the register output after the substitution of said redundancy code for each said code representing a "0" in said effective number.

9. A number and symbol display system according to claim 1, in which said means responsive to the detection of said distinctive code to provide a control output signal includes means operative to emit said control output signal two digit times later than the digit time position of the most significant digit as determined by said detected distinctive code, whereby to normally cause the display of said symbol at a digit position that is two digit positions higher than that of said most significant digit of the displayed effective number, and means operative when said effective number to be displayed has a number of digits one less than the number of digit portions in said display device to cause said control output signal to be emitted one digit time after the digit time of said most significant digit, whereby to cause display of the symbol at the digit portion of said display device occupying the highest digit position therein.

10. A number and symbol display system according to claim 1, in which said means responsive to the detection of said distinctive code to provide a control output signal includes means operative to emit said control output signal one to two digit times later than the digit time position of the most significant digit as determined by said detected distinctive code, whereby to normally cause the display of said symbol at a digit position that is one to two digit positions, respectively, higher than that of said most significant digit of the displayed effective number, and means operative when said effective number to be displayed has a number of digits at least as large as the number of digit portions in said display device to cause the display of said symbol at the digit portion of said display device occupying the highest digit position therein and further to cause said display device to display only the content of the register output representing those digits of the effective number which are at positions below the digit position of said digit portion displaying the symbol.

11. A number and symbol display system according to claim 1, in which said detecting means provides a YES signal upon said detection of the distinctive code and otherwise provides a NOT signal, and in which said means to provide the control signal output includes a first flip-flop circuit which is reset by said NOT signal and set by said YES signal at a digit time later by one than the occurrence of said YES signal and which has reset and set outputs, respectively, a second flip-flop circuit which is reset by said reset output of said first flip-flop circuit and set by said set output of the first flip-flop circuit at a digit time later by one than the occurrence of said set output, said second flip-flop circuit providing a NOT output when reset, and means combining said set output of the first flip-flop circuit, said NOT output of the second flip-flop circuit and a signal indicating the supplying of said symbol code to the display device to provide said control signal output.

12. A number and symbol display system according to claim 11, in which means are provided to set said first flip-flop circuit at the last digit time of a word cycle of the register output when said NOT signal is provided by said detecting means in the next-to-last digit time of said word cycle.

13. A number and symbol display system according to claim 11, further comprising means combining a signal in the last digit time of a word cycle of the register output, a signal indicating that the number of digits in the effective number to be displayed is at least as large as the number of digit portions in said display device and said signal indicating the supplying of the symbol code to provide a combined signal output which causes the display device to display said symbol at the highest digit portion thereof and to display only the content of the register output representing those digits of the effective number which are at positions below the digit position of said digit portion displaying the symbol.

14. A number and symbol display system according to claim 1, in which said detecting means provides a YES signal upon said detection of the distinctive code and otherwise provides a NOT signal, and in which said means to provide the control signal output includes a flip-flop circuit which is reset by said NOT signal and set by said YES signal at a digit time later by one than the detection of said distinctive code and which has a NOT output upon being in its reset condition, and means combining said YES signal from the detecting means, said NOT output of the flip-flop circuit and a signal indicating the supplying of the symbol code to the display device to provide said control signal output for the latter.

15. A number and symbol display system according to claim 14, further comprising means combining a signal in the last digit time of a word cycle of the register output, a signal indicating that the number of digits in the effective number to be displayed is at least as large as the number of digit portions in said display device and said signal indicating the supplying of the symbol code to provide a combined signal output which causes the display device to display said symbol at the highest digit portion thereof and to display only the content of the register output representing those digits of the effective number which are at positions below the digit position of said digit portion displaying the symbol.

References Cited

UNITED STATES PATENTS 3,449,726 6/1969 Kawamoto et al. ---- 340—324X
3,492,656 1/1970 Hildebrandt -------- 340—324X DONALD J. YUSKO, Primary Examiner G. R. SWANN III, Assistant Examiner U.S. Cl. X.R.

340—172.5